US012243407B2

(12) United States Patent
Levin

(10) Patent No.: US 12,243,407 B2
(45) Date of Patent: *Mar. 4, 2025

(54) METHOD AND APPARATUS FOR SOCIAL DISTANCING ALARM SYSTEMS

(71) Applicant: Howard Levin, Austin, TX (US)

(72) Inventor: Howard Levin, Austin, TX (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/215,889

(22) Filed: Jun. 29, 2023

(65) Prior Publication Data

US 2023/0360512 A1 Nov. 9, 2023

Related U.S. Application Data

(63) Continuation of application No. 17/713,234, filed on Apr. 5, 2022, now Pat. No. 11,704,990, which is a continuation of application No. 17/233,870, filed on Apr. 19, 2021, now Pat. No. 11,367,335.

(60) Provisional application No. 63/012,442, filed on Apr. 20, 2020.

(51) Int. Cl.
*G08B 21/18* (2006.01)

(52) U.S. Cl.
CPC .................................. *G08B 21/182* (2013.01)

(58) Field of Classification Search
CPC .............. G08B 21/182; G08B 21/0225; G08B 21/0236; G08B 21/245; G08B 21/22
See application file for complete search history.

(56) References Cited

U.S. PATENT DOCUMENTS

| | | | | |
|---|---|---|---|---|
| 10,372,234 | B2 | 8/2019 | Wang et al. | |
| 11,704,990 | B2 * | 7/2023 | Levin | G08B 21/0236 340/686.6 |
| 2021/0319675 | A1 | 10/2021 | Bitetto et al. | |
| 2022/0084374 | A1 * | 3/2022 | Dour | G06T 11/00 |
| 2022/0172481 | A1 * | 6/2022 | Addison | G06T 7/62 |
| 2022/0198906 | A1 * | 6/2022 | Pollard | G08B 7/06 |
| 2022/0309904 | A1 * | 9/2022 | Neill | G06V 10/40 |
| 2023/0188931 | A1 * | 6/2023 | Mendiola | H04W 4/023 455/456.3 |

* cited by examiner

*Primary Examiner* — Toan N Pham
(74) *Attorney, Agent, or Firm* — Howard Levin

(57) ABSTRACT

A system, method, and apparatus are provided to facilitate social distancing. The system issues alarms based on the distance between a user and an object and one or more variable social distancing thresholds. The system enables trade-offs between risk and a desire to have in-person interaction for different activities by using one or more variable social distancing thresholds that may be based on social distancing guidelines and various characteristics.

30 Claims, 3 Drawing Sheets

METHOD AND APPARATUS FOR SOCIAL DISTANCING ALARM SYSTEMS

RELATED APPLICATIONS

The present application is a continuation of U.S. application Ser. No. 17/713,234 filed on Apr. 5, 2022, entitled "Method and Apparatus For Social Distancing Alarm Systems" that issued on Jul. 18, 2023 as U.S. Pat. No. 11,704,990 which is a continuation of U.S. application Ser. No. 17/233,870 filed on Apr. 19, 2021, entitled "Method and Apparatus For Social Distancing Alarm Systems" that issued on Jun. 21, 2022 as U.S. Pat. No. 11,367,335, which claims the benefit and priority of U.S. Provisional Application No. 63/012,442, entitled "Social Distancing Alarm Device (SDAD) and System" filed on Apr. 20, 2020. This application claims the benefit and priority of the 63/012,442, 17/233,870, and 17/713,234 application Ser. Nos. and U.S. Pat. Nos. 11,367,335 and 11,704,990, which are hereby incorporated by reference herein in their entirety.

TECHNICAL FIELD OF THE INVENTION

The present invention relates to devices, systems, networks, and associated hardware and software provided to facilitate maintaining social distancing.

BACKGROUND OF INVENTION

To stop the spread of COVID-19 in 2020, governments instituted lockdowns that closed businesses and schools and limited in-person interactions. Lockdowns temporarily reduce the spread of disease, but result in significant damage to economies, high unemployment, and undesirable isolation. To mitigate the effects of lockdowns and allow safe in-person interactions during a pandemic, medical authorities recommend reopening businesses and allowing in-person interactions, but only if people maintain a distance between them. Such interaction at a distance is referred to as "social distancing." Medical authorities believe that people can interact without a significant risk of spreading disease if the distance between people is sufficient.

Medical authorities in the USA recommend a social distance for COVID-19 of 6 ft. Local governments mandate that businesses can open, but only if social distancing is enforced and people stay 6 ft. apart from one another, in addition to mask wearing and other risk mitigation practices. Some people willingly practice social distancing, some try, but are not consistent, and still others purposefully ignore the guidelines putting everyone at risk in public spaces, workplaces, stores, etc. Accordingly, there is a need to help remind people to maintain social distancing guidelines with the potential for rewarding those who engage in recommended social distancing behavior and penalizing those who do not.

Some segments of the population are more at risk of severe disease, some are expected to be vaccinated against disease, and different activities may benefit from different social distancing guidelines. Accordingly, systems and devices that aid in maintaining social distancing need to be flexible enough to account for different factors and enable trade-offs between risk and a desire to have in-person interaction for different activities.

SUMMARY OF THE INVENTION

The invention helps maintain social distancing with added flexibility and enables trade-offs between risk and a desire to have in-person interaction for different activities. Embodiments of the invention include a social distancing alarm device (SDAD) capable of issuing an alarm when a SDAD user is within a certain distance threshold of another person, object, or location. Embodiments may use one or more variable distance thresholds based on a variety of factors including social distancing guidelines, health status, activity engaged in, risk level, vaccination status, and other factors. Embodiments may include the storing and processing of interaction information relating to interactions between a SDAD user and people, places, and objects. Other aspects of the invention are described in the accompanying claims, figures and description.

DETAILED DESCRIPTION

Figure 1:
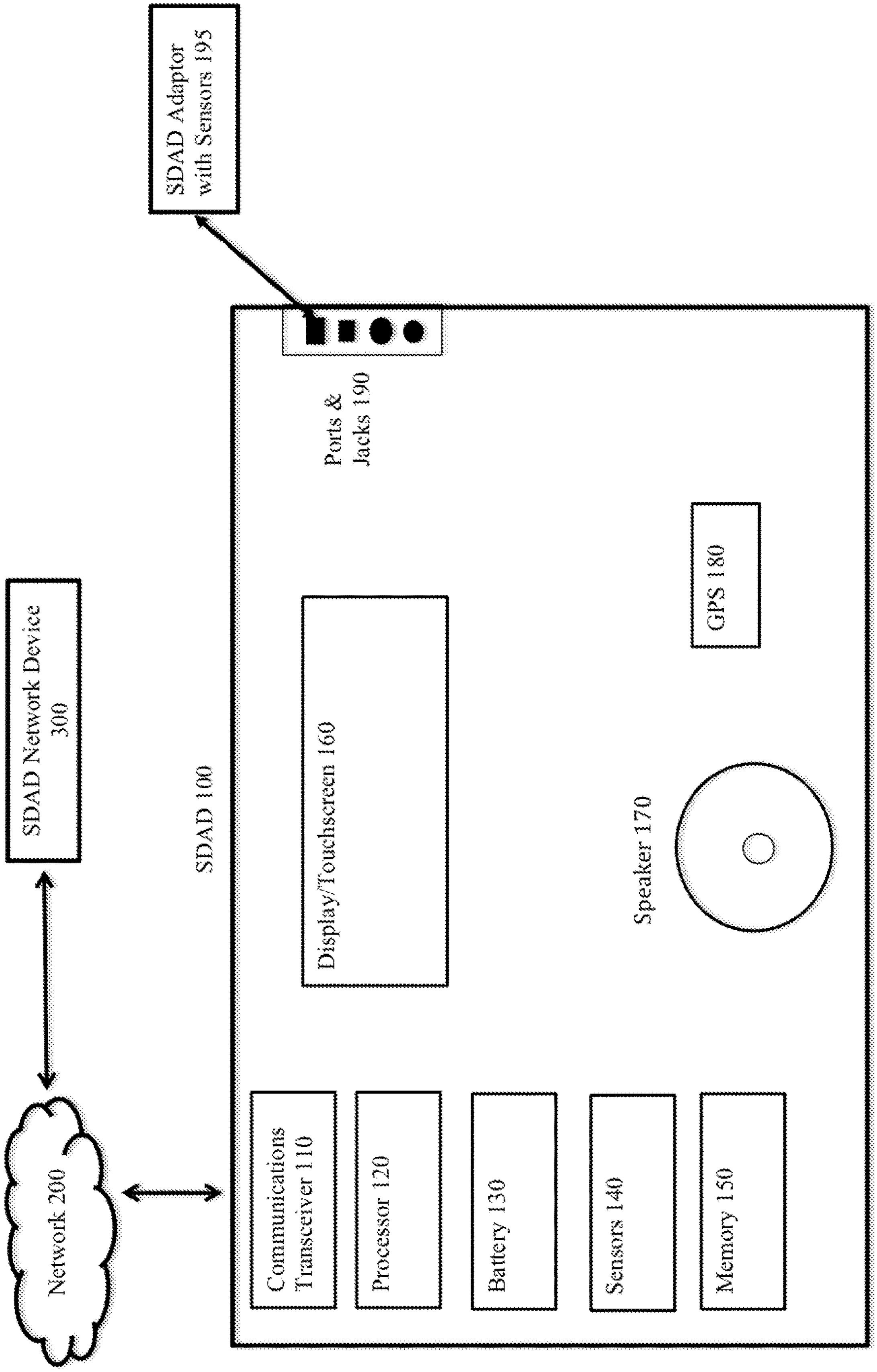
FIG. 1 is an illustration of an embodiment of a social distancing alarm device (SDAD).

FIG. 1 illustrates an exemplary social distancing alarm device (SDAD) 100 optionally coupled with a communications network, Network 200. FIG. 1 also includes a SDAD Network Device 300 optionally coupled with SDAD 100 through Network 200.

A SDAD of the current invention may include a number of hardware and software components. For example, SDAD 100 of FIG. 1 includes a communications transceiver 110, a processor 120, battery 130, sensors 140, memory 150, user interface 160, audio speaker 170, global positioning system (GPS) 180, and ports and jacks interface 190. A SDAD of the present invention may include a subset of the hardware and software components illustrated in FIG. 1 and may also include additional components not illustrated in SDAD 100 of FIG. 1.

In a first embodiment, a SDAD may be implemented with an application or added feature running on an existing personal device (e.g., smart phone, wearable device such as a smart watch or fitness watch, PDA, tablet, etc.). If a SDAD is an added feature or application implemented on an existing device, it may use existing hardware and software technology included in the existing device. For example, a SDAD could be implemented using a smart phone's communication transceivers (e.g., using one or more communications technologies such as Bluetooth, IrDA, 3G/4G/5G, Wi-Fi, IoT, etc.), GPS, camera(s), memory, audio speaker/earphone interface, visual displays, touchscreens or keyboards, and vibration/buzz (i.e., haptic) capabilities. As an example of well-known existing hardware and software technology included in existing devices, applications (also referred to as "Apps") running on personal devices may be implemented by processors executing instructions stored in memory. The phrase "processor-readable medium" shall be taken to include a memory device which is capable of storing or encoding a sequence of instructions for execution by a processor and that causes a device to perform any one of the described and/or claimed methodologies. Such a processor-readable medium includes a machine-readable medium or computer readable medium.

In a second embodiment, a SDAD may be implemented using an add-on device or adaptor coupled to an existing personal device. For example, technology used to implement the SDAD of the invention may be distributed between a SDAD adaptor and an existing personal device. FIG. 1 illustrates an example of a SDAD adaptor 195 coupled to SDAD 100 (e.g., a smart phone or other personal device). Adaptor 195 may be connected physically to SDAD 100 using a port or jack 190 as illustrated in FIG. 1 or may be coupled using wireless technology (e.g., IrDA, Wi-Fi, Bluetooth, 3G/4G/5G, IoT, etc.) or a combination of wireless and physical connections. A SDAD adaptor like adaptor 195 may take the form of a wristband, necklace, a device that attaches to one's belt, to one's ankle, etc. and may include sensors. As another example, SDAD functionality may be distributed between a smart watch and a smart phone.

In a third embodiment, a SDAD may be a standalone dedicated personal wearable device that implements SDAD functionality such as a wristband device, necklace device, a device that attaches to a belt, to one's ankle, etc. In such an embodiment, technology used for various aspects of the invention would be included in the dedicated device.

Other embodiments are within the scope of the invention. For example, for each of the three embodiments described above and other embodiments, SDAD features could be partially implemented on one or more network devices that are separate from the SDAD. As an example, implementation may be distributed between the SDAD worn or held by a person and one or more separate network devices. For example, invention functionality may be distributed between the SDAD and network devices that the SDAD communicates with over a communication network.

As illustrated in FIG. 1, SDAD 100 may be coupled to SDAD network device 300 through network 200. SDAD 100 located on a person may send information from sensors 140 or SDAD adaptor 195 over a wireline or wireless network 200 to network device 300. The receiving network device 300 may process the received information. For example, SDAD network device 300 could record and/or interpret the information received. The network device 300 may send a message to SDAD 100, for example, to sound an alarm based on the received information from SDAD 100 or based on some other criteria such as, for example, a broadcast notification to all SDADs in a particular area. For example, a broadcast could inform SDAD users that someone in the area is sick.

Various types of object detection and distance measurement technology may be used to implement SDAD systems. For example, sensor technologies used for vehicle collision warning systems and automatic braking systems, such as radar, laser (including lidar), and ultrasonic sensors that detect objects, types of objects, and distances to objects may be used. Cameras may also be used to detect distances and identify objects, alone or in combination with other sensor technology (e.g., radar, ultrasonic, laser, etc.). Other examples include using existing GPS technology, such as GPS technology on smart phones and standalone GPS devices to determine the location of a SDAD and the distance to people or objects around the SDAD. Examples of well-known GPS technologies include, but are not limited to location services such as Apple, Inc.'s "Find My iPhone", "Find My Friends", "Find My" applications; map programs including Google Maps, Waze, and Apple Maps; and WhatsApp "Live Location."

In another embodiment, tether technology (e.g., technology used in GPS ankle monitoring for house arrest) may be used. In one embodiment, SDAD sensor technology used to detect objects and determine distances is included in an SDAD adaptor, like adaptor 195 illustrated in FIG. 1, that is coupled to a smart phone or other existing personal device. In another embodiment, SDAD sensor technology is included in a smart phone or personal device as illustrated in sensors 140 of SDAD 100 in FIG. 1

A SDAD may have an identifier (e.g., ID code or associated number) that may be used to identify a SDAD or SDAD user. An identifier may be a phone number, hardware serial number, username or other user associated ID used to identify the user of an SDAD or the SDAD itself.

In one embodiment, a profile of information may be used. Profile information may include one or a variety of types of information. Examples of profile information include one or more of age, health status, social distancing adherence information, and location of a person or device that may be associated with a SDAD identifier. Based on the profile, appropriate distance ranges (discussed below) may be downloaded or received from a network and used by a SDAD. Profile information about a person may be uploaded to a network that is associated with the SDAD identifier in the network. In another embodiment, location of a particular SDAD may be uploaded to a network. As another example, distance range settings from an SDAD could be uploaded to a network. In yet another embodiment, interaction information could be uploaded to a network and processed by a network device such as SDAD network device 300.

In one embodiment, a SDAD may operate on distance ranges. A SDAD may detect when a first object (for example, a person practicing social distancing) is within one or more defined distance ranges (R1 . . . RN) of one or more other objects (e.g., another person nearby, another SDAD nearby, or a geographic location of interest). The number of ranges and values of the ranges could be limited to a specific set of ranges or could be variable and programmable.

As an example, one or more ranges could be an unsafe distance range. For example, an unsafe distance range may be a distance between two people that could result in an unacceptable risk of spread of a virus from one person to another. As another example, one or more ranges may be a warning distance range. A warning distance range may be an amount of buffer space indicating that someone or an object is getting close to an unsafe distance range boundary. As another example, one or more ranges may be a safe distance range. A safe distance range may be a distance that is considered safe and would prevent the spread of a virus between two people.

Figure 2:
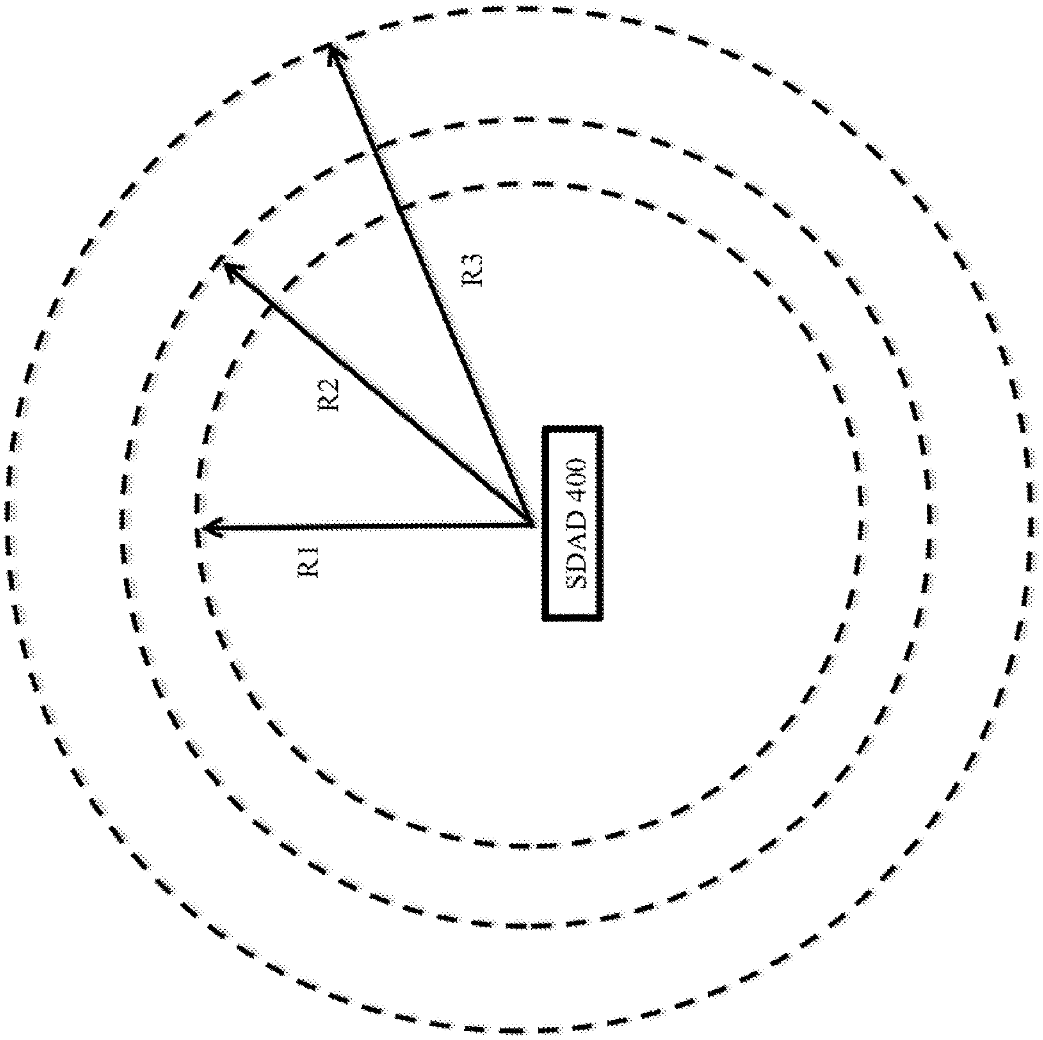
FIG. 2 is an illustration of an embodiment of distance ranges for an SDAD system.

For example, a SDAD may use a single unsafe distance range of R1, such as 6 ft. As another example, a SDAD may use two distance ranges including a R1 unsafe distance range of 6 ft. and a R2 warning range of 8 ft. As another example, illustrated in the exemplary embodiment of FIG. 2, a SDAD may use three distance ranges. In the example shown in FIG. 2, SDAD 400 uses a safe distance range R1 (e.g. 6 ft.), a warning distance range R2 (e.g., 8 ft), and a safe distance range R3 (e.g., 10 ft).

The one or more distance ranges, including unsafe, warning, and safe distance ranges, may be based on one or a combination of different factors. For example, one factor may be social distancing guidelines from the CDC, governments, scientists, doctors, etc. for safe and unsafe distances. As another example, distance ranges may be based on characteristics of the person using a SDAD. For example, because the risk of infection or severity of illness from a virus may be higher for a person with a pre-existing health condition, one or more of the distance ranges can be larger than corresponding ranges for a healthy person. As an example, an unsafe distance range R1 for a healthy person may be set at 6 ft., whereas an unsafe distance range R1 for a person with diabetes may be set at 8 ft.

In other embodiments, ranges may be set based on the age of a person or other risk factors. Ranges may also be set based on whether it is believed that there is a sick person in the vicinity. For example, if a person using a SDAD is in an area with a high incidence of a virus, the ranges may be larger, whereas if there is no known outbreak, the ranges may be shorter. As another example, ranges may be set based on whether the person using a SDAD is sick. As another example, ranges may be set based on the type of infectious disease that is circulating in the local population. Different airborne diseases may have different transmission characteristics.

Ranges may also be set based on the type of activity engaged in or the environment. For example, an unsafe distance range in a restaurant, where there is limited space, may be set at 6 ft., whereas an unsafe distance range for a picnic in a large uncrowded outdoor park may be set at 10 ft. As another example, in constrained spaces such as an airplane, the unsafe distance range may be set to 2 ft. because 6 ft. of separation between people may not be possible. Adjusting the ranges based on these and other factors would allow the SDAD user to make a tradeoff between risk of infection and ability to engage in desirable or necessary activities.

In one embodiment, a SDAD issues alarms. For example, an alarm may be used to modify behavior of the user of an SDAD or of objects that come into contact with the SDAD user. For example, a SDAD may issue different types of alarms depending on how close it is to an object. Embodiments of an SDAD may issue a violation alarm when it is within an unsafe distance range R1 (e.g., 6 ft.) of an object (e.g., a person passing by, an area designated as an infected area, etc.). It may issue a warning alarm if a detected object (e.g. a passerby or infected area) is between R1 (e.g. 6 ft) and R2 (e.g., 8 ft) from the SDAD. It may issue a safe distance indication if the SDAD is at least R2 ft. (e.g., 8 ft. or more) from objects. In one embodiment, a safe distance alarm may be a periodic audible alarm or a visual alarm indicating all clear. As another example, the safe distance indication may be based on a third distance range, R3 that is different than a R2 warning distance range.

Alarms may be audible, visual, or vibrating (i.e., haptic), or a combination thereof. Alarms may have different characteristics for different ranges. For example, an unsafe distance R1 alarm may be louder or higher pitch than a warning distance R2 alarm. As another example, a R1 visual alarm may brighter or blinking at a higher frequency than an R2 alarm. Different alarms may be used to represent different severity levels of social distancing violations. For example, the longer duration in time an object is within an unsafe distance range R1 of a SDAD, the louder or brighter an alarm may get. A warning distance R2 alarm may get louder or brighter or faster in frequency as an object gets closer to the unsafe distance range R1.

An alarm may be issued by the SDAD used by a given person, a SDAD of an object within a distance range of a given person, or both. For example, if two people are both using their own separate SDAD and get too close to one another (i.e., within an unsafe distance range), an alarm could be issued by the SDADs used by both people. Alternatively, an alarm could be issued by only one of the SDADs.

In one embodiment, an alarm may be issued by a SDAD based on a distance range setting of another person. For example, person A who is 75 years old and is immunocompromised may have an unsafe distance range of 10 ft., whereas Person B who is 23 years old and healthy may have an unsafe distance range of 6 ft. In one embodiment, when person A and person B are within 10 ft. of each other, but greater than 6 ft. apart, the SDADs for both person A and person B may issue an alarm. Person B's SDAD may receive a message from a communication network to issue an alarm when person B was within 10 ft. of person A based on person A's risk profile. In another embodiment, information about person A's distance ranges may be downloaded by person B's SDAD and person B's SDAD would issue an alarm if Person A and B are at a distance of 10 ft., even if person B's SDAD unsafe distance range was set to 6 ft. In other words, information about SDAD users or people's risk profiles (e.g., age, health status, vaccination status, etc.) could be used by SDADs in the vicinity to provide more distance protection when needed, and less when not.

Information about interactions between a SDAD and objects may be stored. For example, in areas with network connectivity, information may be stored in SDAD memory or may be uploaded to a network. In areas without network connectivity, interaction information may be stored on the SDAD. In either case, interaction information collected by a SDAD may be periodically uploaded to a network when network access becomes available.

Interaction information may include information about objects that violate distance ranges. This information may be automatically stored or uploaded to a network when a user of a SDAD activates interaction information collection, for example, by pressing an associated button or touchscreen on a SDAD. For example, if person B keeps violating an unsafe distance range R1 of person A, person A may activate storing information about the location, duration, and ID of person B. In another embodiment, interaction information may be automatically stored or uploaded. In yet another embodiment, interaction information may be stored when an alarm is triggered. In another embodiment, interaction information may be stored or uploaded periodically. Interaction information may also include information relating to a vehicle. For example, interaction information including the ID of a driver could be stored when a driver is tailing an SDAD user, driving erratically, or cutting off a SDAD user.

Interaction information may include information about objects that came into contact (e.g., were in the same relative vicinity) with a SDAD, This information may include distances between objects in the vicinity, distances between the SDAD and objects in the vicinity, the duration of those distances, indications of whether or not a distance was below a social distancing guideline and for how long, and the time that the interactions occurred.

Interaction information may relate to interactions between a SDAD and an object without an SDAD. For example, an object (e.g., person) without a SDAD could be identified by its smart phone telephone number or hardware serial number, GPS information, or other identifying information. A location object (e.g., area known to have infections) could be identified by its GPS information or other identifying information. In one embodiment, interaction information may be used for contact tracing.

Embodiments of the invention may allow alarm disabling. In one embodiment, specific types of alarms may be enabled or disabled. For example, audible alarms may be muted or disabled. For example, alarms could be activated in silent mode (e.g., by vibration only) or by visual display with a pop-up warning on a display screen, or flashing lights, etc. A SDAD may determine the distance to objects or people and display the distance. As an example of a visual display, a SDAD may determine the distance to objects or people and display different colors representing different distance ranges. In another embodiment, alarms may be visual only. In another embodiment, alarm types may be configurable by a user of the SDAD or a event owner. For example, a concert event sponsor may deactivate audible alarms during a concert.

In another embodiment, only unsafe distance alarms may be enabled. In another embodiment, alarms may be muted or disabled, but alarm triggering information, such as social distance violations may still be uploaded or stored about the interaction and any other desirable interaction information. In another embodiment, a SDAD may not include alarm functionality but stores or uploads interaction information.

In one embodiment, alarms for certain objects could be disabled. As an example, if a husband and wife both had individual SDADs, a SDAD system may be configured so that the SDADs would not trigger alarms even if alarms were enabled and the husband and wife were within an unsafe distance range of each other. For example, a SDAD may use a safe list that includes the IDs of SDADs or IDs of other objects or places that may be allowed to be within a unsafe distance range without triggering an alarm. If an object or place is detected and the ID for the object or place is on the safe list, alarms caused by proximity to that object may be suppressed. A safe list may be entered on the SDAD by the user, downloaded from the network, or by other means.

A place may be a known area, as opposed to a person. For example, a known area may be designated an infectious area to be avoided and alarms may be triggered based on proximity to that area. Places of interest may be identified by the users of the SDAD or downloaded from a network which includes a database identifying places and locations of interest, including GPS information.

Figure 3:
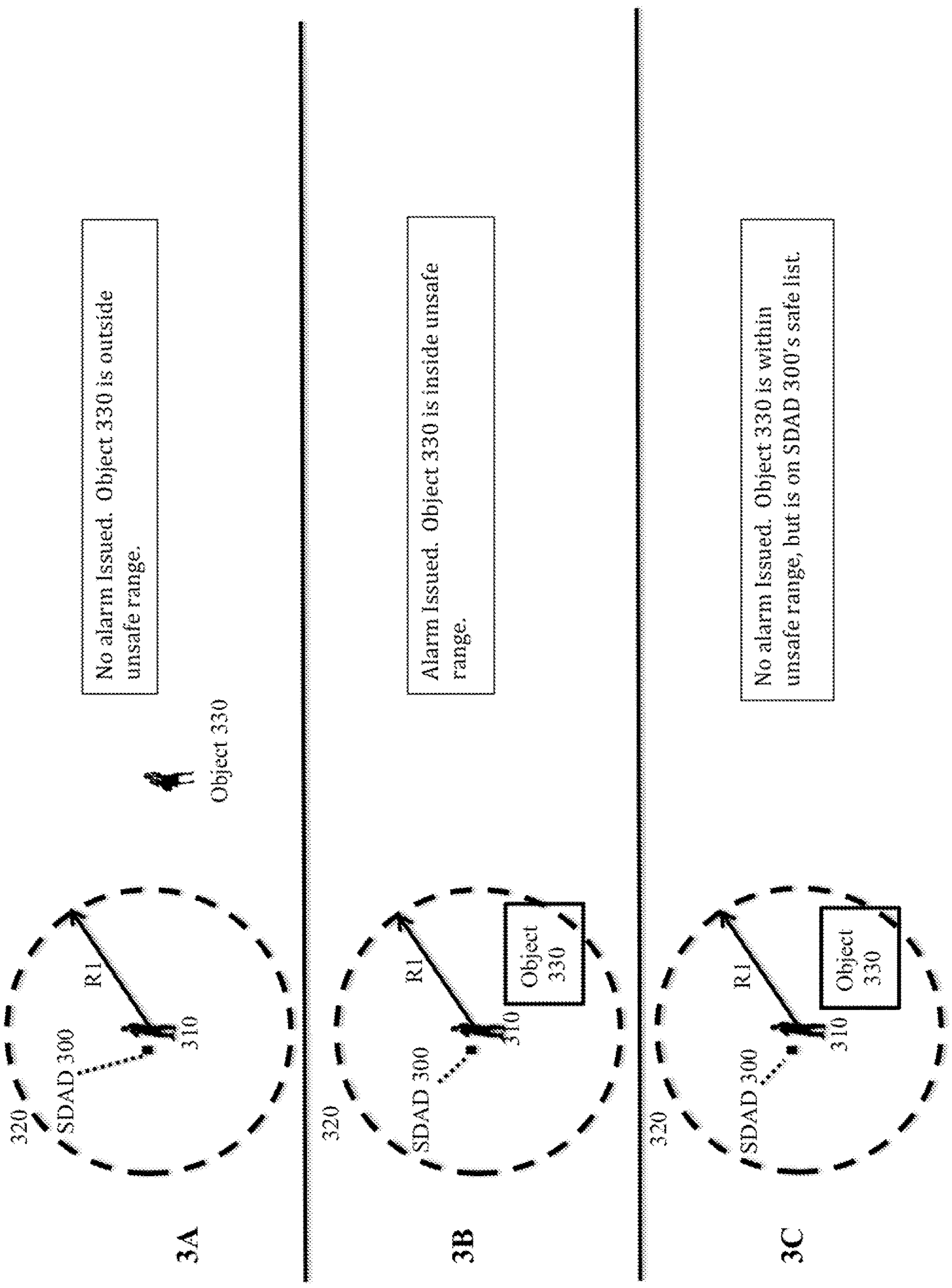
FIG. 3 is an illustration of embodiments of SDAD alarm triggering.

FIG. 3 illustrates various embodiments of triggering a SDAD alarm. In FIG. 3A, a first person 310 uses SDAD 300 with an unsafe distance range of R1. Unsafe distance range zone 320 is a circular representation of an unsafe distance range with radius R1 in all directions. Object 330 (e.g., a second person) is shown to be outside the unsafe distance range zone 320. If object 330 and person 310 remain separated by a distance that is greater than R1 and object 330 remains outside of the unsafe distance range zone 320, no alarm is issued by SDAD 300. In contrast, as illustrated in FIG. 3B, an alarm is issued by SDAD 300 if person 310 and object 330 are separated by a distance which is less than unsafe distance range R1 and object 330 is within the unsafe distance range zone 320.

In the embodiment shown in FIG. 3C, object 330 is included on a safe list accessible by SDAD 300. No alarm is issued by SDAD 300 even though person 310 and object 330 are separated by a distance which is less than unsafe distance range R1 and object 330 is within the unsafe distance range zone 320 because object 330 is on the safe list.

Embodiments of the invention may include a system for penalties and rewards to incentivize adherence to social distancing guidelines. SDAD use may be mandatory in certain locations or while engaging in certain activities. In one embodiment, if a person turns off a SDAD or did not use a SDAD, the person may be penalized. A SDAD may store interaction information that characterizes behavior. For example, it may store the number of alarms caused, duration of alarms, location information of the SDAD, and location information and IDs of objects that triggered alarms, or upload that information to a network.

A SDAD may determine and store or upload information about the identity of the object that caused alarms or who violated social distance guidelines. For example, if SDAD A is stationary and object B moves towards SDAD A and violates a unsafe distance range R1, object B may be determined to be at fault. In other embodiments, different rewards and penalties may be applied based on interaction information including unsafe distance range violations. Interaction information may be used to compute a social distancing score. For example, insurance companies may give discounts on medical care or insurance based on interaction information or offer or deny services based on that information or social distancing score. In another embodiment, SDAD interaction information may be used for social credit scores in places like China. Scores may also be based on a SDAD user wearing a mask or gloves, status of being vaccinated, or engaging in other behaviors that may impact risk of spread of disease.

In one embodiment, everyone may be required to use a SDAD when they shop at a store, or when they go to a sporting event or concert. Event sponsors or store owners may provide penalties and rewards based on interaction information. For example, in a store, if a SDAD was kept on the whole time a customer was inside, and there were no unsafe distance range violations, the customer may get a discount or free item at checkout. In another embodiment, admission to certain events may be closed to people who have interaction information indicating that they do not practice adequate social distancing. Such information could be stored in profiles on SDADs or on a network associated with a SDAD or object ID. At the entrance of an event or when buying tickets, the event sponsor could screen potential attendees' profiles (e.g., use profile information as a vaccine passport). In one embodiment, social distancing scores may be based on a combination of interaction information associated with a user's SDAD and non-SDAD equipment. For example, a person's interaction information may be associated with both an SDAD ID and a smart phone ID without SDAD capability.

The technology described herein can be implemented using hardware, software, or a combination of both hardware and software. Software may be stored in processor readable storage (e.g., memory included in memory 150) to program a processor (e.g., processor 120) to perform the functions described herein. By way of example, and not limitation, processor readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In the foregoing description, aspects of the invention have been described with reference to specific examples and combinations of inventive features and elements in order to explain the principles of the disclosed technology and its practical application. Many modifications and variations are possible in light of the above teachings. Accordingly, the present specification and figures are to be regarded as illustrative rather than restrictive and are not intended to be exhaustive or to limit the subject matter claimed herein to the precise form(s) disclosed. The scope of the invention is to be defined by the claims appended hereto, and by their equivalents.

The invention claimed is:

1. A social distancing alarm device (SDAD) comprising:
- a sensor adapted to detect a first type of object and a second type of object;
- a first variable distance threshold associated with the first type of object;
- a second variable distance threshold associated with the second type of object; and
- a memory device adapted to store the first and second variable distance thresholds,
- wherein the SDAD is adapted to perform a social distancing alarm operation based on at least one of the first or second variable distance thresholds.

2. The social distancing alarm device (SDAD) of claim 1, wherein the first type of object is a person and the second type of object is neither a person nor an SDAD.

3. The social distancing alarm device (SDAD) of claim 2, wherein the sensor comprises a camera for detecting types of objects.

4. The social distancing alarm device (SDAD) of claim 2, further comprising:
- a communications transceiver adapted to send information about a user of the SDAD over a network;
- an audio interface adapted to provide audio alarms; and
- a touchscreen display adapted to display a first distance and a second distance, wherein the first distance is a distance to an object of the first type and the second distance is a distance to an object of the second type.

5. The social distancing alarm device (SDAD) of claim 4 wherein the sensor is further adapted to detect a third type of object and wherein the sensor comprises a camera for detecting types of objects.

6. The social distancing alarm device (SDAD) of claim 5, wherein the SDAD is a personal device selected from the group consisting of a smartphone and a tablet, wherein the information comprises health information, wherein the sensor further comprises a laser adapted to determine the first and second distances, and wherein the touchscreen display is further adapted to provide a user interface adapted to: (a) modify the first and second variable distance thresholds; and (b) disable and enable alarms.

7. The social distancing alarm device (SDAD) of claim 6, wherein at least one of the first or second variable distance thresholds is based on a characteristic of the user of the SDAD.

8. The social distancing alarm device (SDAD) of claim 6, wherein the touchscreen display is further adapted to display the first distance when the first distance is greater than the first variable distance threshold and to display the second distance when the second distance is greater than the second variable distance threshold.

9. The social distancing alarm device (SDAD) of claim 1, wherein at least one of the first variable distance threshold or the second variable distance threshold is based on a characteristic of a user of the SDAD.

10. The social distancing alarm device (SDAD) of claim 9, wherein the characteristic of the user comprises a health characteristic.

11. The social distancing alarm device (SDAD) of claim 1, wherein the second type of object is a location.

12. The social distancing alarm device (SDAD) of claim 1, wherein the sensor is further adapted to detect a third type of object.

13. The social distancing alarm device (SDAD) of claim 1, wherein the first and second variable distance thresholds are based on one or more health characteristics of a user of the SDAD.

14. The social distancing alarm device (SDAD) of claim 1, wherein the SDAD is a personal device selected from the group consisting of a smart phone and a tablet.

15. The social distancing alarm device (SDAD) of claim 1, further comprising:
- an audio interface adapted to provide audio alarms; and
- a touchscreen display adapted to: (1) display a first and a second distance, wherein the first distance is a distance to an object of the first type and the second distance is a distance to an object of the second type; (2) provide a user interface adapted to modify the first and second variable distance thresholds; and (3) enable and disable alarms.

16. The social distancing alarm device (SDAD) of claim 1, further comprising a communication transceiver adapted to send information about a user of the SDAD over a network.

17. The social distancing alarm device (SDAD) of claim 16, wherein the information comprises health, location, and vehicle information.

18. A non-transitory, computer-readable medium (CRM) having instructions stored thereon, wherein the instructions, when executed by a processor, result in operations comprising:
- detecting a first type of object;
- detecting a second type of object;
- determining a first distance, wherein the first distance is a distance to an object of the first type;
- determining a second distance, wherein the second distance is a distance to an object of the second type;
- performing a first comparison comprising comparing the first distance to a first variable distance threshold, wherein the first variable distance threshold is associated with the first type of object;
- performing a second comparison comprising comparing the second distance to a second variable distance threshold, wherein the second variable distance threshold is associated with the second type of object; and
- performing a social distancing alarm operation based on at least one of the first or second comparisons.

19. The non-transitory, computer-readable medium (CRM) of claim 18, wherein the first type of object is a person and the second type of object is neither a person nor an SDAD.

20. The non-transitory, computer-readable medium (CRM) of claim 19, wherein the operations further comprise storing interaction information.

21. The non-transitory, computer-readable medium (CRM) of claim 19, wherein the operations are performed exclusively by a personal device and wherein the operations further comprise:

displaying the first distance and the second distance on a display;

detecting a third type of object; and sending information about a user of the personal device to a communications network.

22. The non-transitory, computer-readable medium (CRM) of claim 21, wherein the information comprises health information.

23. The non-transitory, computer-readable medium (CRM) of claim 22, wherein the operations of detecting the first, second, and third types of object comprise using a camera, wherein the personal device is selected from the group consisting of a smart phone and a tablet, and wherein the social distancing alarm operation comprises an audio alarm.

24. The non-transitory, computer-readable medium (CRM) of claim 23, wherein the information further comprises location and vehicle information.

25. The non-transitory, computer-readable medium (CRM) of claim 23, wherein the operations of determining the first and second distances comprise using a laser, wherein the display is a touchscreen display, wherein the operation of displaying the first distance and the second distance comprises displaying the first distance when the first distance is greater than the first variable distance threshold and displaying the second distance when the second distance is greater than the second variable distance threshold, and wherein the operations further comprise providing a user interface on the touchscreen for modifying the first and second variable distance thresholds and disabling and enabling alarms.

26. The non-transitory, computer-readable medium (CRM) of claim 18, wherein the operations of detecting a first type of object and detecting a second type of object comprise using a camera.

27. The non-transitory, computer-readable medium (CRM) of claim 26, wherein the operations further comprise displaying the first distance and the second distance on a touchscreen display.

28. A method performed exclusively by a personal device, the method comprising:

detecting a first type of object;

detecting a second type of object;

determining a first distance, wherein the first distance is a distance to an object of the first type;

determining a second distance, wherein the second distance is a distance to an object of the second type;

performing a first comparison comprising comparing the first distance to a first variable distance threshold, wherein the first variable distance threshold is associated with the first type of object;

performing a second comparison comprising comparing the second distance to a second variable distance threshold, wherein the second variable distance threshold is associated with the second type of object; and performing an alarm based on at least one of the first or second comparisons.

29. The method of claim 28, wherein the first type of object is a person and the second type of object is neither a person nor an SDAD.

30. The method of claim 28, wherein at least one of the first variable distance threshold or the second variable distance threshold is based on a characteristic of a user of the personal device.

* * * * *